United States Patent
Varnica et al.

(10) Patent No.: US 8,989,252 B1
(45) Date of Patent: Mar. 24, 2015

(54) METHODS AND APPARATUS FOR POWER EFFICIENT ITERATIVE EQUALIZATION

(75) Inventors: Nedeljko Varnica, San Jose, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 282 days.

(21) Appl. No.: 13/354,256

(22) Filed: Jan. 19, 2012

Related U.S. Application Data

(60) Provisional application No. 61/434,349, filed on Jan. 19, 2011.

(51) Int. Cl.
*H03H 7/30* (2006.01)

(52) U.S. Cl.
USPC ........... 375/232; 375/341; 375/350; 714/780; 714/792; 714/794

(58) Field of Classification Search
USPC ......... 375/229, 230, 232, 233, 262, 265, 340, 375/341, 346, 350; 714/746, 752, 774, 780, 714/786, 792, 794–796
See application file for complete search history.

(56) References Cited

U.S. PATENT DOCUMENTS

| | | | | |
|---|---|---|---|---|
| 7,372,921 B2* | 5/2008 | Park et al. | ...... | 375/341 |
| 7,580,469 B2* | 8/2009 | Yonesi et al. | ...... | 375/262 |
| 7,770,090 B1* | 8/2010 | Kons et al. | ...... | 714/780 |
| 8,046,658 B2* | 10/2011 | Heinrich et al. | ...... | 714/752 |
| 8,291,299 B2* | 10/2012 | Li et al. | ...... | 714/774 |
| 2014/0157077 A1* | 6/2014 | Yeo | ...... | 714/752 |

* cited by examiner

*Primary Examiner* — Dac Ha

(57) ABSTRACT

Systems and methods for power efficient iterative equalization on a channel are provided. An iterative decoder decodes received data from a channel detector using a decoding process. The decoder computes a decision metric based on the decoded data and adjusts the number of iterations of the decoding process based on the decision metric. The adjustment occurs prior to a reliability criterion for the decoded data being satisfied. The decoder may pass control back to the channel detector if the adjusted number of iterations has occurred or if the reliability criterion is satisfied. Adjusting the number of iterations of the decoding process may include increasing the number of iterations from a predetermined number of iterations. The decision metric may be based on syndrome weight or hard decisions. The decision metric may be chosen to reduce average power consumption of the detector, the decoder, or circuitry including the detector and the decoder.

21 Claims, 4 Drawing Sheets

METHODS AND APPARATUS FOR POWER EFFICIENT ITERATIVE EQUALIZATION

CROSS-REFERENCE TO RELATED APPLICATIONS

This application claims the benefit under 35 U.S.C. §119(e) of U.S. Provisional Application No. 61/434,349 filed Jan. 19, 2011, which is hereby incorporated by reference herein in its entirety.

FIELD OF USE

The present disclosure relates generally to decoding systems and processes, and in particular to systems and processes for power efficient iterative equalization.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Iterative equalization may be employed by communication and/or data storage systems to detect and correct errors in received or recovered data. Iterative equalization is typically used on channels with dependencies between adjacent symbols such as hard disk drive channels. An iterative equalization system typically includes a channel detector and an iterative decoder that pass messages back and forth to decode data from the channel.

In some instances, e.g. in some time intervals or in certain sectors, code-words, or blocks of data, iterative equalization systems operate inefficiently by performing extraneous iterations at the channel detector, at the iterative decoder, or at both components. Performing extra iterations results in unnecessary power usage, which is undesirable, particularly in low power or mobile devices.

SUMMARY OF THE DISCLOSURE

Systems and methods are provided for power efficient iterative equalization on a channel.

In one embodiment of the present disclosure, a method for iterative equalization on a channel is disclosed. The method includes receiving data from a channel detector; decoding the received data with an iterative decoder using an iterative decoding process. The decoding with the decoder is associated with a number of iterations of the decoding process. The method also includes computing a decision metric based on the decoded data and adjusting the number of iterations of the decoding process based on the decision metric. The adjustment occurs prior to a reliability criterion for the decoded data being satisfied.

In some implementations, the decoder is configured to pass control back to the channel detector if the adjusted number of iterations of the decoding process at the decoder has occurred or if the reliability criterion for the decoded data is satisfied.

In some implementations, the adjusting the number of iterations of the decoding process at the decoder based on the decision metric comprises increasing the number of iterations of the decoding process from a predetermined number of iterations. In some implementations, the decision metric is based on syndrome weight or hard decisions associated with the decoded data. In some implementations, the decision metric is chosen to reduce the average power consumption of one of: the channel detector, the decoder, or circuitry comprising the channel detector and the decoder.

In another embodiment, iterative equalization circuitry is disclosed. The circuitry is configured to receive data from a channel detector and decode the received data with an iterative decoder using an iterative decoding process. The decoding with the decoder is associated with a number of iterations of the decoding process. The circuitry is also configured to compute a decision metric based on the decoded data and adjust the number of iterations of the decoding process at the decoder based on the decision metric, wherein the adjustment occurs prior to a reliability criterion for the decoded data being satisfied.

In some implementations, the decoder is configured to pass control back to the channel detector if the adjusted number of iterations of the decoding process at the decoder has occurred or if the reliability criterion for the decoded data is satisfied.

In some implementations, the adjusting the number of iterations of the decoding process at the decoder based on the decision metric comprises increasing the number of iterations of the decoding process from a predetermined number of iterations. In some implementations, the decision metric is based on syndrome weight or hard decisions. In some implementations, the decision metric is chosen to reduce the average power consumption of one of: the channel detector, the decoder, or the circuitry.

In another embodiment, iterative equalization circuitry is disclosed. The circuitry includes a channel detector configured to receive data; an iterative decoder coupled to the channel detector and configured to decode the received data using an iterative decoding process. The decoding at the decoder is associated with a number of iterations of the decoding process. The decoder is also configured to compute a decision metric based on the decoded data and increase the number of iterations of the decoding process at the decoder above a predetermined number of iterations based on a decision metric computed based on the decoded data prior to a reliability criterion for the decoded data being satisfied.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative embodiments will now be described. However, the systems and processes described herein may be adapted and modified as is appropriate for the application being addressed and that the systems and processes described herein may be employed in other suitable applications, and that such other additions and modifications will not depart from the scope hereof.

As used herein, "information" and "data" refer to any unit or aggregate of energy or signals that contain some meaning or usefulness. Encoding may generally refer to the process of generating data in a manner that facilitates subsequent detection and/or correction of errors in the data, while decoding may generally refer to the counterpart process of detecting and/or correcting the errors. The elements of a coding system that perform encoding and decoding are likewise referred to as encoders and decoders, respectively.

Figure 1:
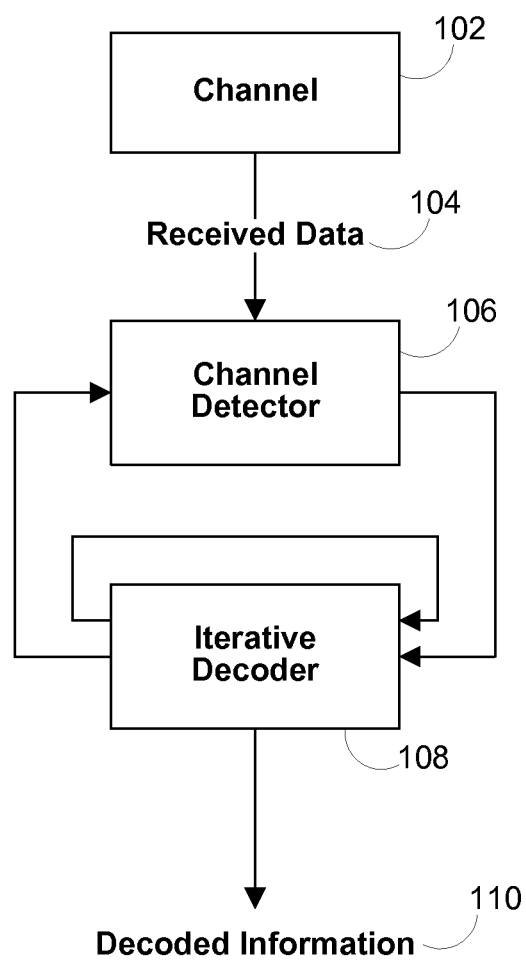
FIG. 1 shows an iterative equalization system according to an embodiment of the present disclosure.

FIG. 1 illustrates an iterative equalization system 100 according to an embodiment of the present disclosure. The system 100 includes a channel 102, received data 104, a channel detector 106, and an iterative decoder 108, and decoded information 110.

The channel 102 is the physical medium through which transmitted data passes or is stored on. In the context of iterative equalization, the channel 102 typically has dependencies between adjacent bits or symbols in, for example, time-domain or space-domain. For example, the channel 102 may be a storage channel that represents a recording medium in a computer system environment, such as magnetic storage, optical or holographic storage, RAM, ROM, or other recording mediums. The channel 102 may also be an audio or visual sensor channel, a RADAR channel, a SONAR channel, a communications channel that represents the wireless propagation environment in a wireless communications environment, or any other channel applicable for signal processing. Various characteristics of the channel 102 may corrupt data that is communicated or stored thereon.

The channel detector 106 may be any suitable soft channel detector, such as a soft output Viterbi algorithm (SOYA) detector or a BCJR detector. The iterative decoder 108 may be any soft decoder, e.g., an iterative low density parity check (LDPC) decoder.

In the system 100, the channel 102 outputs the received data 104 to the channel detector 106. The channel detector 106 operates together with the iterative decoder 108 to decode the received data 104 to produce the decoded information 110 in accordance with iterative decoding principles.

The operation of the channel detector 106 and the iterative decoder 108 includes two different iterative processes—outer iteration and inner iteration. In an outer iteration (e.g. channel iteration), the channel detector 106 passes messages, such as a detected codeword or log-likelihood ratios (LLRs), to the iterative decoder 108 for decoding. The iterative decoder 108 can also pass messages back to the channel detector 106 for use in a subsequent outer iteration. Inner iterations occur within the iterative decoder as part of an outer iteration. For example, the iterative decoder 108 iteratively decodes a detected codeword for a predetermined number of inner iterations during an outer iteration.

The channel detector 106 and the iterative decoder 108 iteratively decode a detected codeword as described above until a stopping criterion is satisfied. For example, the stopping criterion may be satisfied if data decoded by the iterative decoder 108 has satisfied a reliability criterion. If the data decoded by the iterative decoder 108 satisfies a reliability criterion, then the iterative decoder 108 has converged to a valid codeword. The stopping criterion may also be satisfied if a predetermined number of outer or inner iterations have passed, or if a new codeword has been output from the channel 102 so that the channel detector 106 can no longer decode the current codeword.

To improve the power efficiency of the system 100, the number of inner iterations at the iterative decoder 108 may be adjusted based on a decision metric to avoid performing potentially unnecessary outer or inner iterations. The decision metric may be based on syndrome weight, hard decisions, or some other suitable criteria.

To avoid potentially unnecessary outer iterations, the system 100 may skip an outer iteration in order to perform additional inner iterations at the iterative decoder 108 if the decision metric satisfies a "Skipping" criterion. To avoid potentially unnecessary inner iterations, the system 100 may return early to the channel detector 106 to perform another outer iteration rather than finish performing a predetermined number of inner iterations at the iterative decoder 108 if the decision metric satisfies an "Early Return" criterion.

Figure 2:
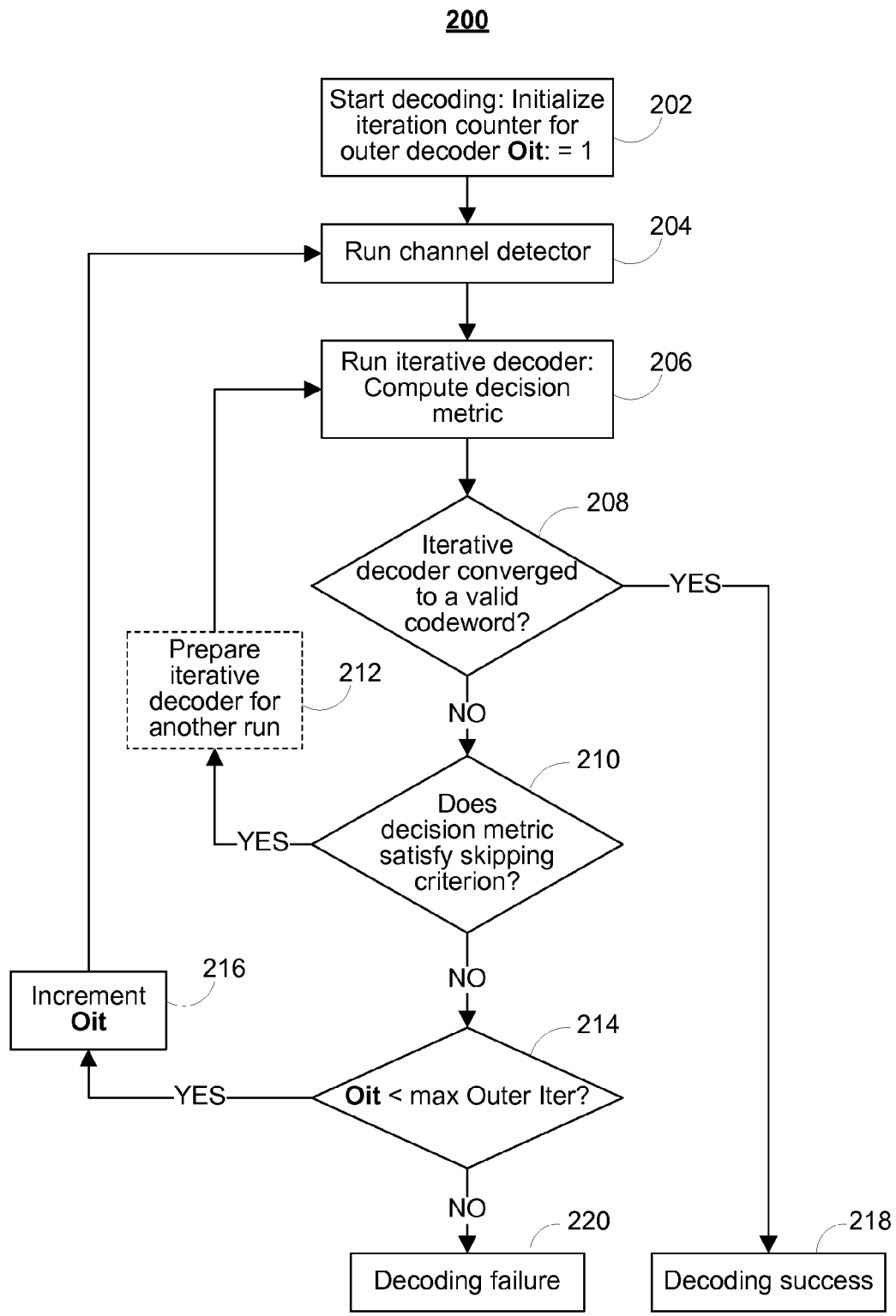
FIG. 2 shows an illustrative process of iterative decoding according to an embodiment of the present disclosure.

FIG. 2 shows an illustrative process 200 of iterative decoding according to an embodiment of the present disclosure. In process 200, data is received from the channel detector 106. The iterative decoder 108 may decode the received data for a number of inner iterations. During the decoding process, the iterative decoder 108 may compute a decision metric based on the decoded data. Prior to a reliability criterion being satisfied for the decoded data (e.g. the iterative decoder 108 converges to a valid codeword), the iterative decoder 108 may adjust the number of inner iterations based on the decision metric by increasing the number of inner iterations. The process 200 is described in further detail below.

At 202, the system 100 prepares to iteratively decode the received data 104 from the channel 102. In some embodiments, the system 100 may set a maximum limit of the number of outer iterations it will run during the decoding process. In some embodiments, an outer iteration counter Oit for tracking the number of outer iterations may be initialized. For example, Oit may be initialized to 1.

At 204, an outer iteration starts. The channel detector 106 processes the received data 104 and the iterative decoder 108 receives data from the channel detector 106 based on the received data 104.

At 206, the iterative decoder 108 iteratively decodes the data for a predetermined number of inner iterations and computes a decision metric. In some embodiments, the decision metric may be based on the syndrome weight of the iterative decoder 108.

At 208, the iterative decoder 108 determines if it has converged to a valid codeword by determining if the decoded data satisfies a reliability criterion. In some embodiments, the reliability criterion may be based on LDPC codes.

At 218, if the iterative decoder 108 has converged to a valid codeword, then decoding is successful, and the iterative decoder 108 may terminate and pass control back to the channel detector 106.

Otherwise, at 210, if the iterative decoder 108 has not yet converged to a valid codeword, then the iterative decoder 108 checks if the decision metric satisfies a "Skipping" criterion. In some embodiments, 210 is performed only during certain outer iteration(s) or after a predetermined number of outer iteration(s).

If the decision metric satisfies the "Skipping" Criterion, then the iterative decoder 108 adjusts the number of iterations at the iterative decoder 108 by running additional inner iterations. At 212, the iterative decoder 108 prepares to run additional inner iterations, and 206, 208, and 210 are repeated. In some embodiments, 212 is optional if the iterative decoder 108 does not need to do any preparation to continue running inner iterations. In some embodiments, the iterative decoder 108 determines the number of additional inner iterations to run based on the decision metric.

Otherwise, at 214, if the decision metric does not satisfy the "Skipping" criterion, then the iterative decoder 108 passes control back to the channel detector 106. In some embodiments, the system 100 may determine whether or not it has exceeded the maximum number of outer iterations for decoding the received data 104. For example, at 214 the outer iteration counter Oit may be compared to max Outer Iter, a predetermined maximum threshold number of outer iterations. If Oit is greater than or equal to max Outer Iter, then at 220, the decoding of the current codeword has failed, and the system 100 either moves on to the next detected codeword or waits for more received data to be output from the channel 102. Otherwise, if Oit is less than max Outer Iter, then at 216 Oit is incremented, and another outer iteration is run, starting with 204.

As described above, in the process 200, the decision metric may be based on the syndrome weight of the iterative decoder 108. The syndrome weight may be calculated exactly or approximately. If the syndrome weight is low, e.g. lower than a pre-determined threshold, then the decision metric satisfies the "Skipping" criterion, and the iterative decoder 108 runs for more inner iterations rather than returning to the channel detector 106 for another outer iteration. When the syndrome weight is low, the iterative decoder 108 may likely converge to a valid codeword in relatively small number of additional inner iterations. Advantageously, the process 200 may avoid potentially unnecessary outer iterations by increasing the number of inner iterations at the iterative decoder 108 before running another outer iteration if the decision metric is satisfied. Thus, the process 200 may improve the power efficiency of the system 100.

The decision metric in the process 200 can be any decision metric that indicates that it is more beneficial to continue performing inner iterations at the iterative decoder 108 rather than perform another outer iteration with additional information from the iterative decoder 108 provided as input to the channel detector 106. The decision metric may be based on syndrome weight as described above, or based on hard decisions associated with the decoded data at the iterative decoder 108. For example, if the number of hard decision changes at the iterative decoder 108 in t inner iterations is small, then the iterative decoder 108 will likely converge to a valid codeword in a relatively small number of additional inner iterations. Thus, using a decision metric based on the monitoring of hard decisions in t inner iterations may be suitable. The value t may be a fraction of an inner iteration, a full inner iteration, or multiple inner iterations.

As described above, the decision rule for skipping or not skipping an outer iteration at 210 may be performed after a predetermined number of inner iterations at the decoder has occurred. For example, the decision rule may be performed in a single outer iteration (e.g. only after the first outer iteration), in several outer iterations (e.g. after the first and second outer iterations), or in all outer iterations.

Process 200 of FIG. 2 is merely illustrative. Any operations in process 200 may be modified (e.g., performed in a different order), combined, or removed, and any additional operations may be added to process 200, without departing from the scope of the present disclosure.

Figure 3:
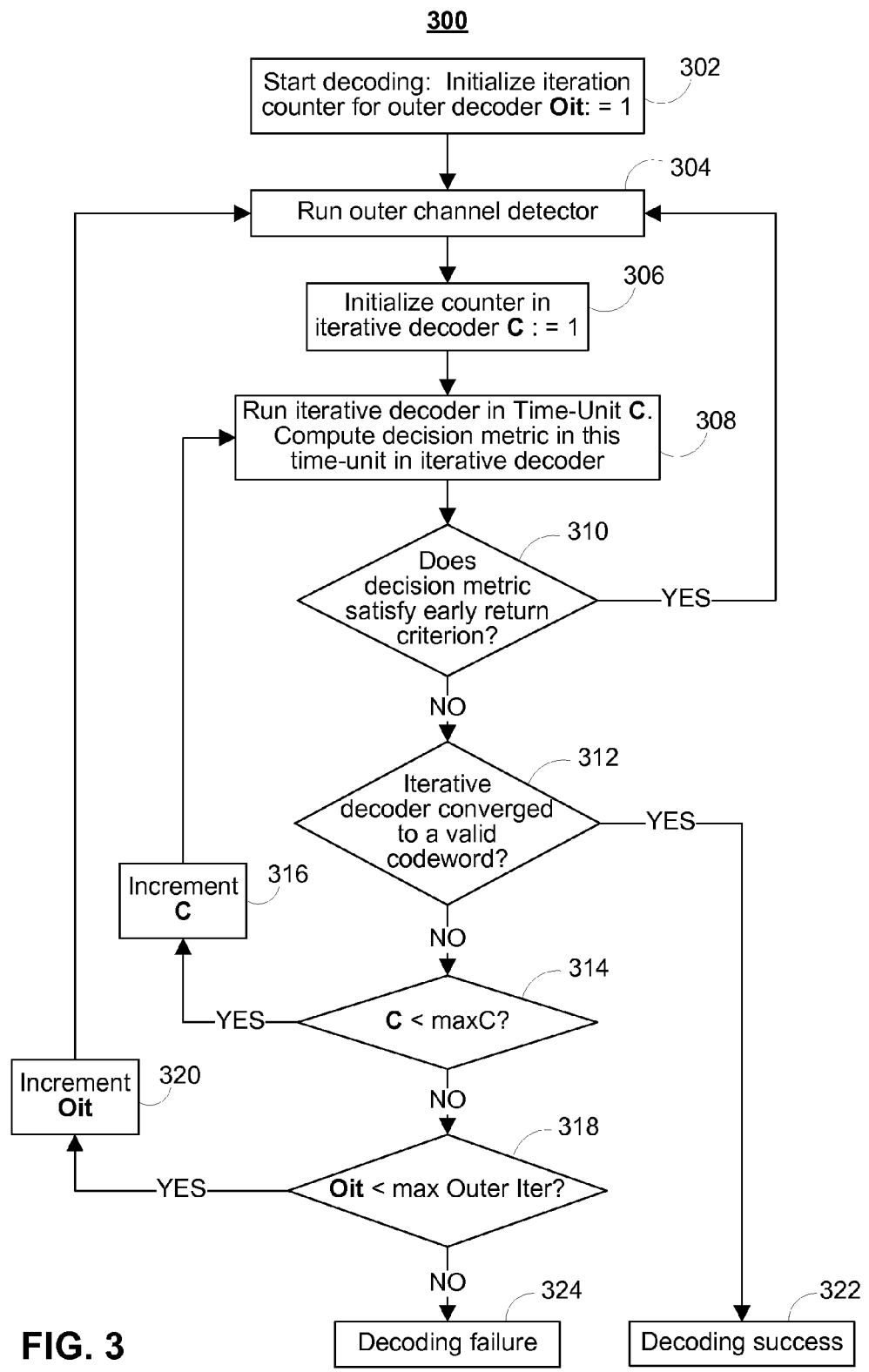
FIG. 3 shows an illustrative process of iterative decoding according to an embodiment of the present disclosure.

FIG. 3 shows an illustrative process 300 of iterative decoding according to an embodiment of the present disclosure. In process 300, data is received from the channel detector 106. The iterative decoder 108 decodes the received data for a number of inner iterations. During the decoding process, the iterative decoder 108 computes a decision metric based on the decoded data. Prior to a reliability criterion being satisfied for the decoded data (e.g. the iterative decoder 108 converges to a valid codeword), the iterative decoder 108 may adjust the number of inner iterations based on the decision metric, passing control back to the channel detector 106 before completing the number of inner iterations. The process 300 is described in further detail below.

At 302, the system 100 prepares to iteratively decode the received data 104. In some embodiments, the system 100 may set a maximum limit of the number of outer iterations it will run during the decoding process. In some embodiments, an outer iteration counter Oit for tracking the number of outer iterations may be initialized. For example, Oit may be initialized to 1.

Next, at 304, the process 300 starts an outer iteration. The channel detector 106 processes the received data 104 and the iterative decoder 108 receives data from the channel detector 106 based on the received data 104.

At 306, the iterative decoder 108 prepares to iteratively decode the data. In some embodiments, the system 100 may set a maximum limit on the number of inner iterations run at the iterative decoder 108 before control is passed back to the channel detector 106. In some embodiments, an inner iteration counter C at the iterative decoder 108 for counting the number of inner iterations is initialized. For example, C may be initialized to 1.

At 308, the iterative decoder 108 iteratively decodes the data for one inner iteration, and computes the decision metric.

At 310, the iterative decoder 108 determines if the decision metric satisfies an "Early Return" Criterion. In some embodiments, 310 is performed only after a predetermined number of inner iterations or only during certain inner iterations.

If the decision metric does satisfy the "Early Return" criterion, then the iterative decoder 108 adjusts the number of iterations at the iterative decoder 108 by ceasing to run inner iterations. The iterative decoder 108 stops running inner iterations and passes control back to the channel detector 106 to run another outer iteration starting at 304. In some embodiments, the iterative decoder 108 may pass messages based on the partially decoded data to the channel detector 106.

Otherwise, at 312, if the decision metric does not satisfy the "Early Return" criterion, then the iterative decoder 108 determines if it has converged to a valid codeword by determining if the decoded data satisfies a reliability criterion. For example, the reliability criterion may be based on LDPC codes. If the iterative decoder 108 has converged to a valid codeword, then at 322, decoding is successful, and the iterative decoder 108 may terminate and pass control back to the channel detector 106.

At 314, if the iterative decoder 108 has not converged to a valid codeword, then process 300 continues to the end of the current inner iteration. At this point, in some embodiments, the iterative decoder 108 may determine whether or not it has exceeded the maximum number of inner iterations. For example, at 314, the inner iteration counter C may be compared to maxC, a predetermined maximum threshold number of inner iterations. At 316, if C is less than maxC, then C is incremented, and another inner iteration is run, e.g. 308, 310, and 312 are repeated. Otherwise if C is greater than or equal to maxC, then process 300 exits the iterative decoder 108 and continues to the end of the current outer iteration.

Finally, at 318, the outer iteration counter Oit is compared to max Outer Iter, a predetermined maximum threshold number of outer iterations. If Oit is greater than or equal to max Outer Iter, then decoding of the current codeword has failed, and at 324, the system 100 either moves on to the next detected codeword or waits for more received data to be output from the channel 102. Otherwise, at 320, Oit is incremented, and another outer iteration is run, starting at 304.

As described above, by returning to the channel detector 106 early rather than first completing maxC inner iterations, the iterative decoder 108 may obtain improved information from the channel detector 106 sooner to assist with the decoding. Advantageously, process 300 may avoid potentially unnecessary inner iterations by returning to the channel detector 106 early if the decision metric satisfies the "Early Return" criterion. Thus, process 300 may improve the power efficiency of the system 100.

The decision metric in process 300 can be any decision metric based on suitable criteria, such as syndrome weight or hard decisions associated with decoded data at the iterative decoder 108, as described previously.

In some embodiments, the inner iteration counter C may be used to count units of time during inner iterations at the iterative decoder 108. A unit of time may be a clock cycle, a fraction of an inner iteration, or a full inner iteration. The value maxC is the maximum number of units of time given to the iterative decoder 108 to run prior to returning to the channel detector 106 for the next outer iteration. In the example above, a unit of time is equivalent to a full inner iteration, and maxC is equal to a maximum threshold number of inner iterations.

In some embodiments, process 200 and process 300 may both be used. In other embodiments, process 200 may be used, and process 300 is optional or vice versa.

The power consumption of the channel detector 106 during one outer iteration may be expressed by the value Pod, and the power consumption of the iterative decoder 108 during one outer iteration may be expressed by the value Pid.

In process 200, by skipping one outer iteration to perform additional inner iterations when the iterative decoder 108 may be close to convergence, the power savings may be equivalent to 1 Pod at the cost of a small increase in Pid due to the additional inner iterations. In properly optimized systems, the increase in Pid may be much less on average than 1 Pod.

In process 300, by performing an early return to the channel detector 106 when the iterative decoder 108 may not be close to convergence, the power savings may be likely equivalent to a fraction of Pid due to the avoidance of unnecessary inner iterations. The power savings may be due to the fact that the iterative decoder 108 would probably have returned to the channel detector 106 after completing the maximum number of inner iterations.

Process 300 of FIG. 3 is merely illustrative. Any operations in process 300 may be modified (e.g., performed in a different order), combined, or removed, and any additional operations may be added to process 300, without departing from the scope of the present disclosure.

Figure 4:
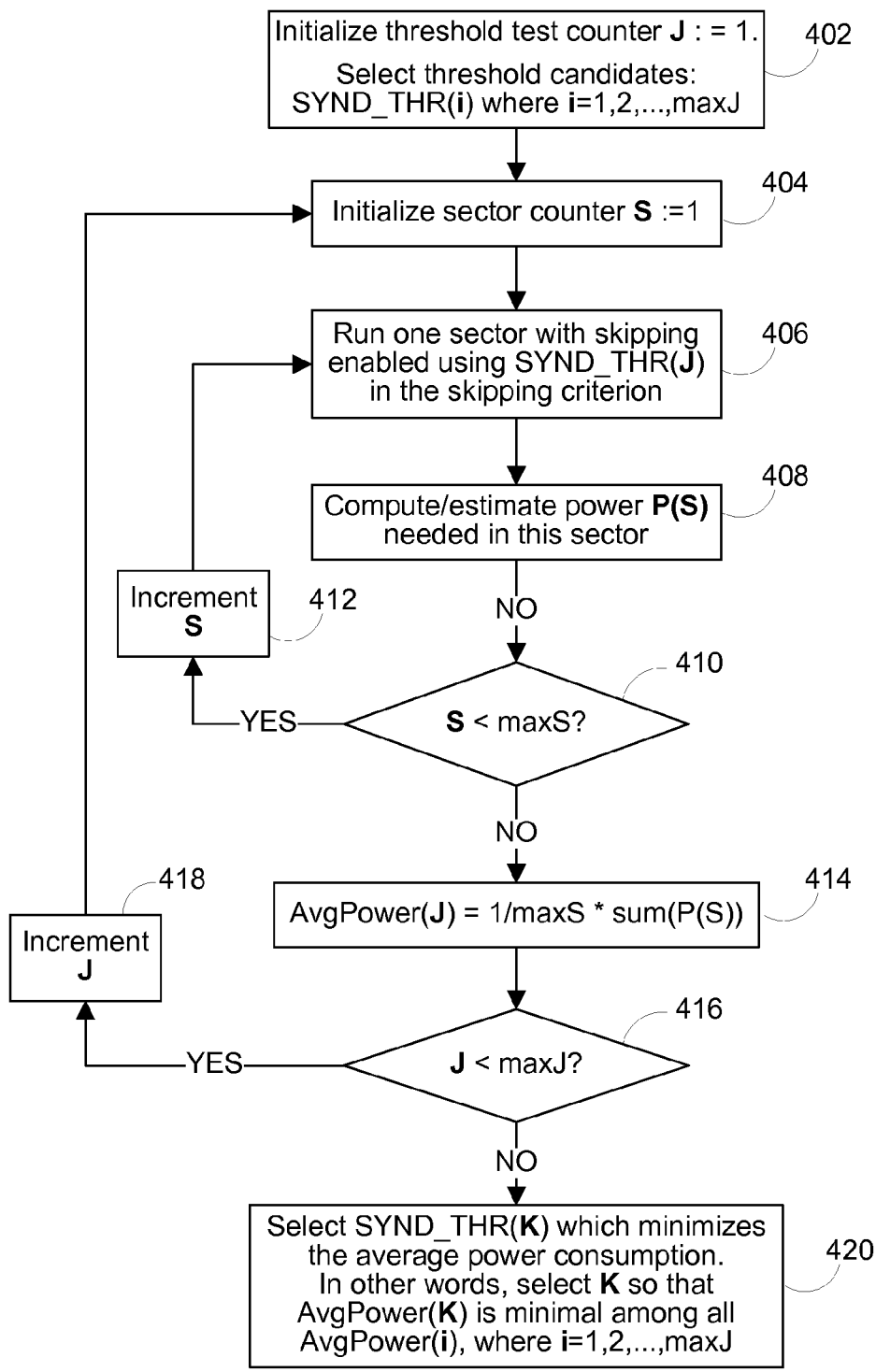
FIG. 4 shows an illustrative process of selecting a decision metric threshold value according to an embodiment of the present disclosure.

FIG. 4 shows an illustrative process 400 of selecting an optimal decision metric threshold value according to an embodiment of the present disclosure. In this example, the decision metric is based on syndrome weight and is used to determine whether or not to skip an outer iteration according to process 200. Process 400 may conduct decoding tests using the system 100 on a number of sectors to select an optimal syndrome weight threshold value. Advantageously, using the optimal threshold value in the decision metric may minimize the average power consumption of a given channel detector and iterative decoder.

A sector may be a collection of bits or symbols, such as a codeword over a communications channel or a block of bits or symbols stored on a hard disk drive sector.

At 402, process 400 may initialize a threshold test counter J. For example, J may be initialized to 1. J may be used to iterate over all possible candidates SYND_THR(i) for the syndrome weight threshold value, where i=1, 2, ..., maxJ, and maxJ is the maximum index for the SYND_THR(i).

Then, at 404, process 400 may initialize a sector counter S in preparation for a decoding test. For example, S may be initialized to 1. During the decoding test, process 400 may decode one sector at a time using the decoding process 200 (e.g. skip outer iteration) until a number maxS of sectors have been decoded.

Next, at 406, the Sth sector may be decoded as described in process 200 using a syndrome weight threshold value of SYND_THR(J) in the decision metric.

At 408, the amount of power P(S) consumed by the system 100 during the decoding of the Sth sector may be computed or estimated. P(S) may be stored for use in later calculations.

At 410, S is compared to maxS. If S is less than maxS, then at 412, S is incremented, and 406, 408, and 410 are repeated. If S is greater than or equal to maxS, then at 414, the average power consumption AvgPower(J) for the threshold value SYND_THR(J) may be computed or estimated according to the equation AvgPower(J):=sum(P(S))/maxS. In this example, sum(P(S)) refers to the sum of P(S) over the values of S from 1 to maxS. AvgPower(J) may be stored for later comparison.

Next, at 416, J is compared to maxJ. If J is less than maxJ, then at 418, J is incremented, and process 400 goes back to 404. In other words, the next candidate threshold value is tested by decoding the maxS sectors again.

Otherwise, if J is greater than or equal to maxJ, then all of the candidate threshold values have been tested. With the decoding testing complete, the process 400 may compare all of the different AvgPower(i) values and select SYND_THR (K) such that AvgPower(K) is minimal among all AvgPower (i). The value SYND_THR(K) may be the optimal value for the syndrome weight threshold value in the decision metric of the decoding process 200.

In some embodiments, process 400 may use hard decision monitoring or other suitable criteria for the decision metric. In some embodiments, process 400 may use the decoding process 300 (e.g. early return to channel detector) instead of process 200 (e.g. skip outer iteration) or process 400 may use both process 200 and process 300. In some embodiments, process 400 may select the threshold value that minimizes the average power consumption of only the channel detector 106 or only the iterative decoder 108. In some embodiments, process 400 may select the threshold value that minimizes the average power consumption of circuitry that includes the channel detector 106 and the iterative decoder 108. In some embodiments, process 400 may select the threshold value that maximizes the decoding throughput of the system 100 or the threshold value that optimizes some other suitable criterion or combination of suitable criteria.

Process 400 of FIG. 4 is merely illustrative. Any operations in process 400 may be modified (e.g., performed in a different order), combined, or removed, and any additional operations may be added to process 400, without departing from the scope of the present disclosure.

The foregoing is merely illustrative of the principles of this disclosure and various modifications can be made without departing from the scope of the present disclosure. The above described embodiments of the present disclosure are presented for purposes of illustration and not of limitation, and the present disclosure is limited only by the claims which follow.

What is claimed is:

1. A method of iterative equalization on a channel, comprising:

receiving data from a channel detector;

decoding the received data with an iterative decoder using an iterative decoding process, wherein the decoding with the decoder is associated with a number of iterations of the decoding process, wherein at least a subset of the iterations each corresponds to an instance of the iterative decoder receiving the data from the channel detector;

computing a decision metric based on the decoded data; and adjusting the number of iterations of the decoding process at the decoder based on the decision metric, wherein the adjustment occurs prior to a reliability criterion for the decoded data being satisfied.

2. The method of claim 1, wherein the decoder is configured to pass control back to the channel detector if the adjusted number of iterations of the decoding process at the decoder has occurred or if the reliability criterion for the decoded data is satisfied.

3. The method of claim 1, wherein the adjusting the number of iterations of the decoding process at the decoder based on the decision metric comprises increasing the number of iterations of the decoding process from a predetermined number of iterations.

4. The method of claim 3, wherein the amount by which the number of iterations of the decoding process is increased is based on the decision metric.

5. The method of claim 1, wherein the decoder is configured to pass control back to the channel detector based on the decision metric before the number of iterations of the decoding process at the decoder has occurred.

6. The method of claim 1, wherein the adjusting the number of iterations of the decoding process at the decoder occurs after a predetermined number of iterations of the decoding process at the decoder has occurred.

7. The method of claim 1, wherein the decision metric is based on syndrome weight or hard decisions associated with the decoded data.

8. The method of claim 1, wherein the decision metric is chosen to reduce the average power consumption of one of: the channel detector, the decoder, or circuitry comprising the channel detector and the decoder.

9. The method of claim 1, wherein the iterations that correspond to instances of the iterative decoder receiving the data from the channel detector are outer iterations, and at least another subset of the iterations are inner iterations, each inner iteration corresponding to one iteration of the iterative decoding process.

10. Iterative equalization circuitry comprising receiver circuitry configured to:

receive data from a channel detector;

decode the received data with an iterative decoder using an iterative decoding process, wherein the decoding with the decoder is associated with a number of iterations of the decoding process, wherein at least a subset of the iterations each correspond to an instance of the iterative decoder receiving the data from the channel detector;

compute a decision metric based on the decoded data; and adjust the number of iterations of the decoding process at the decoder based on the decision metric, wherein the adjustment occurs prior to a reliability criterion for the decoded data being satisfied.

11. The circuitry of claim 10, wherein the decoder is configured to pass control back to the channel detector if the adjusted number of iterations of the decoding process at the decoder has occurred or if the reliability criterion for the decoded data is satisfied.

12. The circuitry of claim 10, wherein the adjusting the number of iterations of the decoding process at the decoder based on the decision metric comprises increasing the number of iterations of the decoding process from a predetermined number of iterations.

13. The circuitry of claim 12, wherein the amount by which the number of iterations of the decoding process is increased is based on the decision metric.

14. The circuitry of claim 10, wherein the decoder is configured to pass control back to the channel detector based on the decision metric before the number of iterations of the decoding process at the decoder has occurred.

15. The circuitry of claim 10, wherein the adjusting the number of iterations of the decoding process at the iterative decoder occurs after a predetermined number of iterations of the decoding process at the decoder occur.

16. The circuitry of claim 10, wherein the decision metric is based on syndrome weight or hard decisions.

17. The circuitry of claim 10, wherein the decision metric is chosen to reduce the average power consumption of one of: the channel detector, the decoder, or the circuitry.

18. Iterative equalization circuitry, comprising:

a channel detector configured to receive data;

an iterative decoder coupled to the channel detector and configured to:

decode the received data using an iterative decoding process, wherein the decoding at the decoder is associated with a number of iterations of the decoding process, wherein at least a subset of the iterations each correspond to an instance of the iterative decoder receiving the data from the channel detector; and compute a decision metric based on the decoded data, wherein the decoder increases, based on the decision metric, the number of iterations of the decoding process at the decoder above a predetermined number of iterations and prior to a reliability criterion for the decoded data being satisfied.

19. The circuitry of claim 16, wherein the decoder is configured to pass control back to the channel detector based on the decision metric before the number of iterations of the decoding process at the decoder has occurred.

20. The circuitry of claim 18, wherein the decision metric is based on syndrome weight or hard decisions associated with the decoded data.

21. The circuitry of claim 18, wherein the iterative decoder comprises an LDPC decoder or a Turbo decoder.

* * * * *